June 8, 1948. W. E. LYMAN 2,442,818
STRAINER
Filed Nov. 26, 1945

INVENTOR
WILLIAM E. LYMAN
BY Chapin & Neal
ATTORNEYS

Patented June 8, 1948

2,442,818

UNITED STATES PATENT OFFICE 2,442,818

STRAINER

William E. Lyman, Greenwich, N. Y.

Application November 26, 1945, Serial No. 630,754

5 Claims. (Cl. 210—154)

This invention relates to an improved strainer. It is particularly adapted to strain honey where large amounts are handled. A principal, but not the only, feature is the improved means provided for handling the work when the strainer needs to be cleaned.

Strainers for handling honey in large amounts have been in use for some time. Screens are arranged in series from coarse to fine mesh. Their constructions give trouble in lost time and even in lost honey, and require considerable extra equipment for straining the screen contents when they clog. Strainers of this class are adapted for a continuous flow; honey is poured in and strained honey flows out in a continuously flowing operation, and the thing that stops the work is clogging of any one of the screens in the strainer. The problem then is to get the work done with less loss due to screen clogging.

The improved apparatus is disclosed by way of an example in the drawings.

Figure 1:
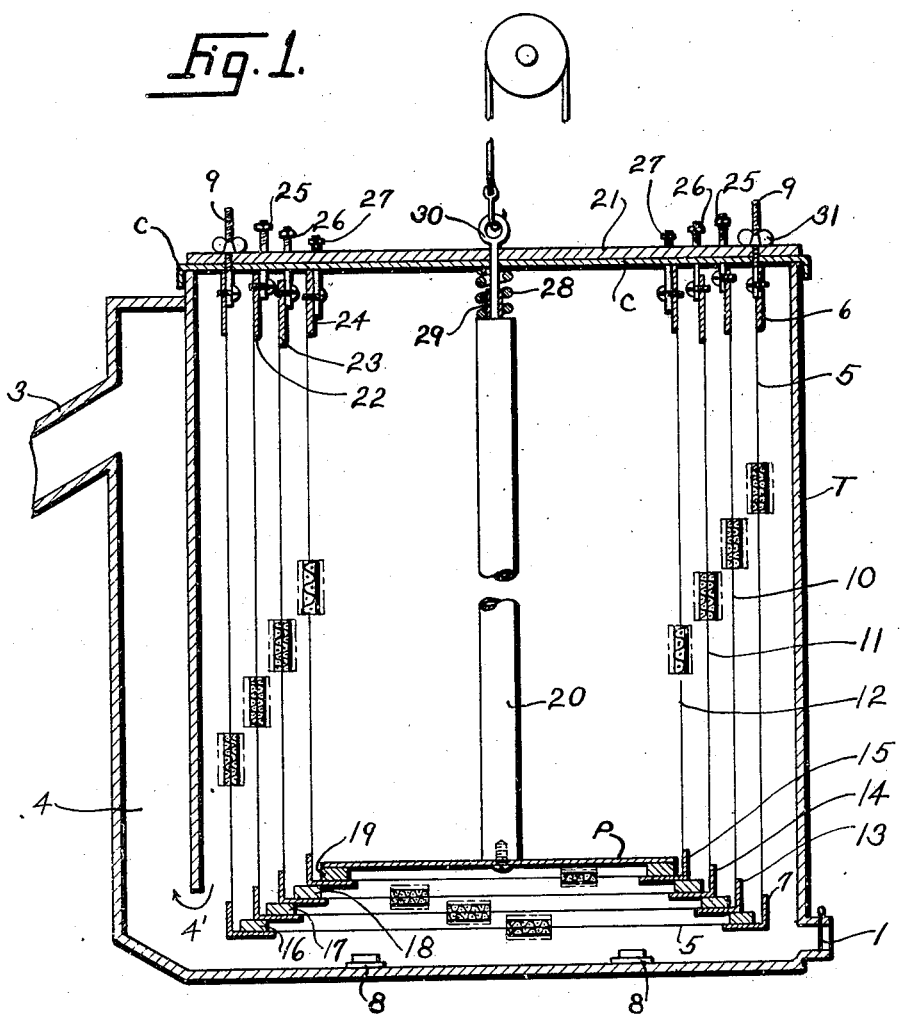
Fig. 1 is a vertical section through the new apparatus.

The outside casing or tank T may contain several hundred pounds of honey at one time. It is poured through the indicated cover opening O. After passing through the screens it flows through the outlet conduit 3, as indicated. The valve 1 at the bottom, is for draining when desired. The valve is normally closed. The tank T has a vertical passage 4 on one side to receive the strained honey from the bottom opening 4'. As honey is fed in the opening O seen in the top cover C, it is strained through the screens to be described, and as the level rises the strained honey feeds through the bottom opening 4' and the passage 4 and out near the top through conduit 3 under a hydraulic head, as long as unstrained honey is fed in through the cover opening.

So far this is the normal operation of the pertinent prior art strainers. The tank such as T may hold several hundred pounds at one time; sometimes the capacity is around a thousand pounds. The difficulty comes in the prior art structures when one or more of the screens get clogged. The present practice when one or more screens get clogged is:

First, if the strainers have no gates in the bottoms, to hoist them up above tank T and leave them for hours, for as much honey as possible to drain out, and then lower the strainers and pour the remaining undrained honey into some kind of improvised extra straining equipment, or Second, if the strainers have gates in the bottoms, as some in the prior art structures have, to open these gates by means of attached wires and let the unstrained honey run through the main tank, out through a bottom valve, and into extra straining equipment at a lower level. This necessitates washing considerable honey from the sides and bottom of the main tank every time the strainers are washed.

Both practices involve losses in time and honey, necessitates extra cleaning work, and extra equipment. It is to avoid all this that the details of this invention have been conceived for this sort of strainer.

The particular feature of the invention, in the example shown, is the provision in all strainers of large bottom screen areas which are closed off from the liquid that normally strains through the side walls, and are used only when the latter become clogged. Their one purpose is the straining of the contents of all cylindrical screens prior to washing. The construction is such that the liquid can be completely drained out fully strained, and the assembly of strainers, with the cover, can be moved into and out of the strainer tank as one unit, and disassembly or assembly can be done quickly where it should be—in the wash room.

As a useful example embodying the principles of this invention, the new details will be described in their relation.

Screen 5 is a cylinder of light mesh, the fine screen of the series. At the top it is reinforced by the band 6. It may also be reinforced by a stiff layer of coarser mesh since the 80-mesh screen cloth of which it is usually made is not very strong as a sheet. The sheet of the 80-mesh is indicated by line 5 and a portion of it is indicated in enlarged size of cross sectional screen form. The enlarged showing is indicated with supporting layers, one on each side, but only one need be used. While all the screens have this indicated in the drawing, it will be understood that the coarse mesh screens may not need them. This sort of detail in a cylindrical screen arrangement is of course well known by itself and commonly used. The fine mesh screen 5 is fastened at the bottom to a stiff angular or channel ring 7 which is imperforate. To this ring is fastened a large central bottom sheet of fine screen mesh 5 with reinforcing coarser mesh like that on the cylindrical side. The screen 5, by means of its channel ring 7 may sometimes rest on circularly spaced blocks 8 in any desired manner but the preferred construction is for the screen 5 assembly to be suspended from the cover C by vertical threaded rods 9 attached to the stiff ring 6 as indicated. These threaded rods 9 have thumb nuts 31 used to hold the fine screen construction vertically in the desired position as will be explained.

Inside cylindrical screen 5, as shown, there is a series of progressively coarser and similar screen cylinders, for example, 50-mesh and 30-mesh, of the same cylinder or pail-like form. Any number of screens may be used. In the example, a 12-mesh screen is indicated within the 30-mesh. The 50-mesh and 30-mesh will be referred to as screens 10 and 11 and the inner screen as 12. Screens 10, 11 and 12 have angular metal bottom rings 13, 14 and 15 like ring 7 of screen 5 with similar large central bottom screen areas of the same size wire mesh as their sides. An imperforate packing ring or gasket 16 rests on ring 7. Similar packing rings 17, 18 and 19 rest respectively on the angular bottom rings 13, 14 and 15 of screens 10, 11 and 12. Within screen cylinder 12, or whichever is the inner one of the screens, in a particular embodiment of the invention, there is an imperforate bottom plate P. Plate P is fastened to central rod 20 and normally is pressed on the packing ring 19 of angle ring 15 of screen 12 by its weight and tension of spring 28 acting beneath the cover C around the spacer 29 of eye bolt 30, all as indicated in Fig. 1. Eye bolt 30 is fastened to the top of rod 20 and extends adjustably and loosely through cover C and bar 21. The latter reinforces and is a part of the cover.

Each of the screens 10, 11 and 12 have top ring hoops 22, 23 and 24 respectively. To these hoops are fastened supporting or lifting rods 25, 26 and 27 respectively. These extend loosely through and above cover C and bar 21 with progressively less spacing, as indicated between bar 21 and the top heads marked as adjustable nuts. These nuts are engageable with bar 21 when the supporting screen 5 is lowered provided thumb nuts 31 are turned to a level above the heads 25. The loop of eye bolt 30 has less spacing than the head of rod 27 but is engageable with the cover C or cross bar 21 when screen 5 is lowered as the whole assembly goes into tank T.

Figure 2:
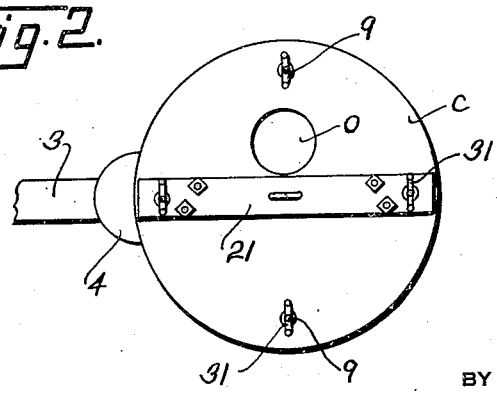
Fig. 2 is a top view.

Looking at Figs. 1 and 2 it is seen that honey poured in cover opening O can pass through the side screen portions but cannot go through the bottom ones. It also appears that the turning up of the thumb nuts 31 to the tops of rods 9 allows a progressive settling apart of the screen constructions and the plate P, the screens 5, 10, 11 and 12 and the plate descending by their weight different distances to the extent permitted by the thumb nuts 31, and heads 25, 26, 27 and loop 30. The steps in the descent are as follows: as thumb nuts 31 are turned up the screen 5, which supports all other screens with pressure upward against the plate spring 28 during normal straining, goes down. Plate P through eye bolt 30 is almost immediately held up or suspended on the bar 21 or cover C. As screen 5 continues to go down screen 12 becomes held up by the heads 27, then the screen 11 by heads 26, screen 10 by heads 25, and finally screen 5 by thumb nuts 31. A passageway now exists for straining the contents of all screens through the bottom screen areas when the valve 1 of tank T is opened.

With this construction it is clear also that the opening of a passage through the bottom screens accomplished by the progressive lowering of screens and plate different distances may likewise be accomplished by progressive lifting of plate and screens different distances as might be done by attaching a crane hook to eye bolt 30 and turning up thumb nuts 31. The entire assembly can be lifted as desired, the spacer 29 preventing too great compression of spring 28, and, after draining, can be taken to any suitable place for cleaning, brought back assembled, and lowered into the tank.

Disassembly of the screen assembly, as for washing, is accomplished by removal of thumb nuts 31, and threaded heads of rods 25, 26 and 27. The cover may be lifted off with the plate assembly, and screens 12, 11, 10 and 5 and the packing rings taken apart.

If desired the screens may be removed individually before draining all the honey from tank T after taking off thumb nuts 31 and heads of rods 25, 26 and 27 and lifting off the plate and cover assembly.

Though not needed, circularly spaced blocks 8 may be put in the bottom of tank T or attached as legs to the underside of ring 7 of screen 5 as supports. If this is done these should preferably project only enough to act as a rest for screen 5 when thumb nuts 31 have been loosened to the tops of rods 9 so that the bottom screens and plate are separated from the packing rings, and a way exists past the plate and through the bottom screens. Placed in this way the blocks 8 furnish a support for screen 5 when liquid is drained from the tank more rapidly than it can come through the bottom screen area and also provides a support for screen 5 if the cover and plate assembly and the inner screens are removed individually.

The results and advantages of the closed large bottom screen areas and of the separation or opening of the same in the manner described, while in the tank, will now be specifically pointed out. Assuming that wax or other material has plugged the screen, and it usually but not necessarily plugs the finest screen first, the progressive lowering or lifting steps permit honey to flow in a new way while the whole screen construction is still in tank T. When the bottom plate P is removed from its seat, honey unstrained by the coarse screen 12 is freed to flow through its bottom and then as the screens 11 and 10 in turn are unseated from their packing rings all the honey therein is freed to flow downward through the finest mesh screen of the series. Honey or the like may be drawn out the valve 1 of tank T, and as the drawing out proceeds the strainers become emptied; or the honey may be left in the tank T and strainers raised, accomplishing the same effect of emptying strainers through the unclogged bottoms. Thus, no matter which screen is plugged the contents will be strained by the clean screen bottoms. The results are, therefore, that the contents of the tank are fully strained and remain in strained condition, and the screens can be completely drained and removed as a group without loss of time or tank contents or use of additional equipment for handling unstrained honey.

Of course the details of construction as to size, number and mesh of screens, and mere mechanical elements per se, may be varied without departing from the essential structure in the combination and its mode of operation as herein disclosed by way of example.

Having disclosed my invention, I claim it as follows:

1. A strainer construction for honey and the like, comprising a tank with inlet and outlet for continuous flow, a screen element in the shape of a slightly smaller tank whose side and bottom walls are made up of screen material to adapt such element to serve as a screen to removably rest within said tank, supports for mounting the screen element within the tank with side and bottom walls of the screen element and corresponding walls of the tank in spaced relation, a packing ring positioned around and adjacent the peripheral margin of the bottom wall on the inside of the screen element, a supplementary bottom wall in the form of an imperforate and movable plate adapted to normally rest on said packing ring to close off and when lifted to open up and thus control the flow of material through the bottom wall of the screen element to the end that the bottom wall of the screen element may be kept clean during normal straining through the sides of the screen element only and when such sides of the screen element become clogged, the honey or the like still within the screen element may then be strained out through the unclogged bottom wall upon the lifting of said plate and the screen element may be removed substantially empty for cleaning without loss of time or tank contents or use of additional screening equipment.

2. A strainer construction for honey and the like, comprising a tank with inlet and outlet for continuous flow, a screen element in the shape of a slightly smaller tank whose side and bottom walls are made of screen material to adapt such element to serve as a screen to removably rest within said tank, supports for mounting the screen element within the tank with side and bottom walls of the screen element and corresponding walls of the tank in spaced relation, a packing ring positioned around and adjacent the peripheral margin of the bottom wall on the inside of the screen element, a supplementary bottom wall in the form of an imperforate and movable plate adapted to normally rest on the packing ring and with its edge slightly spaced from the side walls of the screen element, said plate being adapted to close off and when lifted to open up and thus control the flow of material through the bottom wall of the screen element for the purpose of keeping such bottom wall clean during normal straining through the side walls of the screen element, until they are clogged, a rod operable from the top of the tank to lift said plate when the side walls of the screen element become clogged and by lifting said plate permitting contents of the screen element to strain through its clean bottom wall as the screen element is lifted for removal from the tank to be cleaned.

3. In a honey strainer, a tank with an inlet at the top and an outlet extending from the bottom and discharging near the top under hydraulic head, a tank drain outlet valve at the bottom, a cover for the tank, a screen element with side and bottom walls of screen material and in the shape of a slightly smaller tank, said element being mounted on the cover to hang into the tank from the cover with the side and bottom walls of the screen material in spaced relation to corresponding walls of the tank, a movable imperforate plate of slightly less area than the bottom wall of the screen element, a packing ring to lie on said bottom wall between it and the edge margin of the plate to close off the flow of material through the bottom wall of the screen element until said plate is lifted so that said bottom wall of screen material may be kept clean during normal straining through the side walls of screen material in the screen element, a rod operable from the top of the tank and connected to said plate for lifting it when the side walls of the screen element become clogged, lifting attachments on the cover to raise it and said screen element hung on the cover so that any unstrained honey in the screen element may drain out through its bottom wall and said element can then be removed in empty condition from said tank for cleaning the screen material.

4. A strainer construction for honey and the like, comprising a tank with inlet and outlet for continuous flow, a removable cover for said tank, a set of concentric cylindrical screen elements with screen material in their bottoms and side walls, hangers mounted on said cover to support said cylindrical screen elements in the tank with their side and bottom walls of screen material in spaced relation with those of adjacent elements and the corresponding walls of the tank, said elements being individually supported by said hangers from said cover for use and insertion and removal individually or as a group as the cover is respectively in tank covering position, lowered to such position or lifted from such position with one or more of said elements carried by their hangers, an imperforate plate movable to cover or uncover the bottom of the innermost screen element, a packing ring to cooperate with said plate to seal off said bottom, other packing rings adapted to be placed between the screen element bottoms and cooperate with the plate and its packing ring to seal off the series of screen bottom elements from the fluid to be strained so that these may be kept clean during normal straining through the sides of the screen elements, a rod operable from the top of said tank having a lost motion connection with said cover and connected to said plate whereby the latter may be lifted, said hangers having lost motion connections with said cover, said lost motion connections with said cover being arranged in different amounts, all constructed and arranged so that when the side walls of the screen elements become clogged, the liquid within the screens may be strained out through the unclogged bottoms and the screen elements may be removed empty for cleaning without loss of time or tank contents or use of additional equipment.

5. In a honey strainer, a tank with an inlet at the top and an outlet extending from the bottom and discharging near the top under hydraulic head, a tank drain outlet valve at the bottom, a supporting member on the top of said tank, a series of concentric tubular screen elements with walls and bottoms of screen material, said screen elements extending down from said supporting member, and mounted in spaced relation to each other and the tank, adapted for use and insertion and removal individually or as a group, an imperforate plate construction to cover the bottom of the innermost screen element and packing rings adapted to be placed between screen bottoms and between the innermost screen bottom and said plate to close off the series of bottom screens from the fluid to be strained so that these may be kept clean during normal straining through the sides, and means consisting in lost motion connecting devices between said supporting member on the top of the tank to separate plate and screens by moving these parts one away from another in a vertical direction to unseal said packing rings, whereby when the side walls become clogged the liquid within the screens may be strained out through the unclogged bottoms and the screen structure may be removed empty for cleaning without loss of time or tank contents or use of other equipment.

WILLIAM E. LYMAN.

REFERENCES CITED

The following references are of record in the file of this patent:

UNITED STATES PATENTS

| Number | Name | Date |
|---|---|---|
| 1,507,929 | Mosher | Sept. 9, 1924 |
| 1,563,904 | Kerckhoff et al. | Dec. 1, 1925 |
| 1,564,666 | Griffin | Dec. 8, 1925 |